United States Patent
Zhang et al.

(10) Patent No.: US 11,774,794 B2
(45) Date of Patent: Oct. 3, 2023

(54) LIQUID CRYSTAL DISPLAY PANEL

(71) Applicant: TCL CHINA STAR OPTOELECTRONICS TECHNOLOGY CO., LTD., Shenzhen (CN)

(72) Inventors: Yihe Zhang, Shenzhen (CN); Zhijun Huang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 396 days.

(21) Appl. No.: 17/055,553

(22) PCT Filed: Aug. 31, 2020

(86) PCT No.: PCT/CN2020/112631
§ 371 (c)(1),
(2) Date: Nov. 13, 2020

(87) PCT Pub. No.: WO2022/007154
PCT Pub. Date: Jan. 13, 2022

(65) Prior Publication Data
US 2022/0308390 A1    Sep. 29, 2022

(30) Foreign Application Priority Data

Jul. 8, 2020    (CN) .......................... 202010652662.2

(51) Int. Cl.
*G02F 1/1335*    (2006.01)
*G02F 1/1343*    (2006.01)

(52) U.S. Cl.
CPC .. *G02F 1/133514* (2013.01); *G02F 1/133553* (2013.01); *G02F 1/134309* (2013.01)

(58) Field of Classification Search
None
See application file for complete search history.

(56) References Cited

U.S. PATENT DOCUMENTS

| | | | | |
|---|---|---|---|---|
| 8,330,907 B2 * | 12/2012 | Hashimoto | ....... | G02F 1/133502 349/123 |
| 2003/0020854 A1 * | 1/2003 | Satake | .............. | G02F 1/133553 349/113 |

FOREIGN PATENT DOCUMENTS

| CN | 1209565 A | 3/1999 |
|---|---|---|
| CN | 101576679 A | 11/2009 |

(Continued)

OTHER PUBLICATIONS

International Search Report in International application No. PCT/CN2020/112631, dated Mar. 25, 2021.

(Continued)

*Primary Examiner* — Richard H Kim
(74) *Attorney, Agent, or Firm* — PV IP PC; Wei Te Chung; Zhigang Ma

(57) ABSTRACT

A liquid crystal display panel is provided, which includes a color filter substrate, an array substrate disposed opposite to the color filter substrate, and a liquid crystal layer disposed between the color filter substrate and the array substrate. The array substrate includes: a substrate; an array driving layer disposed on the substrate; an insulating layer disposed on the array driving layer; a pixel electrode disposed on the insulating layer and electrically connected to a thin film transistor in the array driving layer by a via hole on the insulating layer; and a distributed Bragg reflective film disposed on the pixel electrode.

14 Claims, 2 Drawing Sheets

(56) References Cited

FOREIGN PATENT DOCUMENTS

| | | | |
|---|---|---|---|
| CN | 102707536 | A | 10/2012 |
| CN | 104102052 | A | 10/2014 |
| CN | 108845442 | A | 11/2018 |
| CN | 108873455 | A | 11/2018 |
| CN | 109613747 | A | 4/2019 |
| JP | H11316373 | A | 11/1999 |
| JP | 2004294804 | A | 10/2004 |

OTHER PUBLICATIONS

Written Opinion of the International Search Authority in international application No. PCT/CN2020/112631, dated Mar. 25, 2021.

* cited by examiner

LIQUID CRYSTAL DISPLAY PANEL

CROSS REFERENCE TO RELATED APPLICATIONS

The present application is a Notional Phase of PCT Patent Application No. PCT/CN2020/112631 having international filing date of Aug. 31, 2020, which claims priority of the Chinese patent application No. 202010652662.2 filed on Jul. 8, 2020 with the National Intellectual Property Administration, titled "Liquid crystal display panel", which is incorporated by reference in the present application in its entirety.

FIELD OF INVENTION

The present disclosure relates to the field of display technologies, and more particularly, to a liquid crystal display panel.

BACKGROUND OF INVENTION

With rapid development of e-books, a requirement of eye protection for displays is getting higher. Electronic ink technology has been widely used and developed in recent years, but electronic ink is usually limited to a display mode of black, white, and gray, and has a longer response time, which cannot meet requirements of color pictures and videos for people. Therefore, it is necessary to find a better solution.

Liquid crystal displays (LCDs) are widely used in many electronic products in daily life, such as mobile phones, digital cameras, and computers. Due to their excellent characteristics, such as lightweightness, small volumes, low electromagnetic interference, and low power consumption, they have been widely used in people's daily production and life, and have become mainstream in current display field. In particular, total reflective liquid crystal displays omit backlights having higher power consumption, so they can display normally at lower power consumption and can also meet needs of full-color, high refresh rates, etc. However, since the total reflective liquid crystal displays have no backlight, they need stronger ambient light for display. Reflectivity of the total reflective liquid crystal displays are usually only around 10%, which has lower utilization of the ambient light, so the total reflective liquid crystal displays cannot display normally under darker ambient light, thereby limiting applications of the total reflective liquid crystal displays on certain occasions.

Therefore, there are defects in current technology and there is an urgent need to solve these defects.

Technical problem: the present disclosure provides a liquid crystal display panel, which can solve problems of lower utilization of ambient light and inability to display normally under darker ambient light in conventional total reflective liquid crystal display panels.

SUMMARY OF INVENTION

In order to solve the above problems, the present disclosure provides technical solutions as follows.

The present disclosure provides a liquid crystal display panel, which includes a color filter substrate, an array substrate disposed opposite to the color filter substrate, and a liquid crystal layer disposed between the color filter substrate and the array substrate, wherein the array substrate includes:

a substrate;
an array driving layer disposed on the substrate;
an insulating layer disposed on the array driving layer;
a pixel electrode disposed on the insulating layer and electrically connected to a thin film transistor in the array driving layer by a via hole on the insulating layer; and
a distributed Bragg reflective film disposed on the pixel electrode.

In the liquid crystal display panel of the present disclosure, the distributed Bragg reflective film includes M reflective film groups in a stack, and each of the reflective film groups includes N sub reflective layers, wherein M is a positive integer of greater than or equal to 1, and N is a positive integer of greater than or equal to 2.

In the liquid crystal display panel of the present disclosure, refractive indexes of different sub reflective layers in a same reflective film group are different.

In the liquid crystal display panel of the present disclosure, the refractive indexes of the sub reflective layers in the same reflective film group are reduced layer by layer from one side adjacent to the pixel electrode to one side away from the pixel electrode.

In the liquid crystal display panel of the present disclosure, thicknesses of the reflective film groups are odd multiples of a quarter of wavelengths.

In the liquid crystal display panel of the present disclosure, thicknesses of different reflective film groups in the distributed Bragg reflective film are different.

In the liquid crystal display panel of the present disclosure, materials of the sub reflective layers include silicon nitride and silicon oxide.

In the liquid crystal display panel of the present disclosure, the pixel electrode is a reflective electrode and includes a metal reflective layer and an electrode layer disposed on the metal reflective layer.

In the liquid crystal display panel of the present disclosure, an orthographic projection of the distributed Bragg reflective film on the substrate at least covers an orthographic projection of the pixel electrode on the substrate.

In the liquid crystal display panel of the present disclosure, one side surface of the insulating layer facing the pixel electrode is provided with a plurality of protruding structures corresponding to the pixel electrode, and the metal reflective layer is disposed undulatedly along a surface of the protruding structures.

In order to solve the above problems, the present disclosure also provides a liquid crystal display panel, which includes a color filter substrate, an array substrate disposed opposite to the color filter substrate, and a liquid crystal layer disposed between the color filter substrate and the array substrate. Wherein, the color filter substrate includes color resists and a common electrode, and the array substrate includes:

a substrate;
an array driving layer disposed on the substrate;
an insulating layer disposed on the array driving layer;
a pixel electrode disposed on the insulating layer and electrically connected to a thin film transistor in the array driving layer by a via hole on the insulating layer; and
a distributed Bragg reflective film disposed on the pixel electrode.

In the liquid crystal display panel of the present disclosure, the distributed Bragg reflective film includes M reflective film groups in a stack, and each of the reflective film groups includes N sub reflective layers, wherein M is a positive integer of greater than or equal to 1, and N is a positive integer of greater than or equal to 2.

In the liquid crystal display panel of the present disclosure, refractive indexes of different sub reflective layers in a same reflective film group are different.

In the liquid crystal display panel of the present disclosure, the refractive indexes of the sub reflective layers in the same reflective film group are reduced layer by layer from one side adjacent to the pixel electrode to one side away from the pixel electrode.

In the liquid crystal display panel of the present disclosure, thicknesses of the reflective film groups are odd multiples of a quarter of wavelengths.

In the liquid crystal display panel of the present disclosure, thicknesses of different reflective film groups in the distributed Bragg reflective film are different.

In the liquid crystal display panel of the present disclosure, materials of the sub reflective layers include silicon nitride and silicon oxide.

In the liquid crystal display panel of the present disclosure, the pixel electrode is a reflective electrode and includes a metal reflective layer and an electrode layer disposed on the metal reflective layer.

In the liquid crystal display panel of the present disclosure, an orthographic projection of the distributed Bragg reflective film on the substrate at least covers an orthographic projection of the pixel electrode on the substrate.

In the liquid crystal display panel of the present disclosure, one side surface of the insulating layer facing the pixel electrode is provided with a plurality of protruding structures corresponding to the pixel electrode, and the metal reflective layer is disposed undulatedly along a surface of the protruding structures.

Beneficial effect: beneficial effects of the present disclosure are that by disposing the distributed Bragg reflective film on the metal reflective layer of a total reflective liquid crystal display panel, the liquid crystal display panel provided in the present disclosure can improve light reflectivity of the total reflective liquid crystal display panel, thereby solving problems of lower utilization of ambient light and inability to display normally under darker ambient light in conventional total reflective liquid crystal display panels.

DESCRIPTION OF DRAWINGS

The following detailed description of specific embodiments of the present disclosure will make the technical solutions and other beneficial effects of the present disclosure obvious with reference to the accompanying drawings.

DETAILED DESCRIPTION OF PREFERRED EMBODIMENTS

Figure 1:
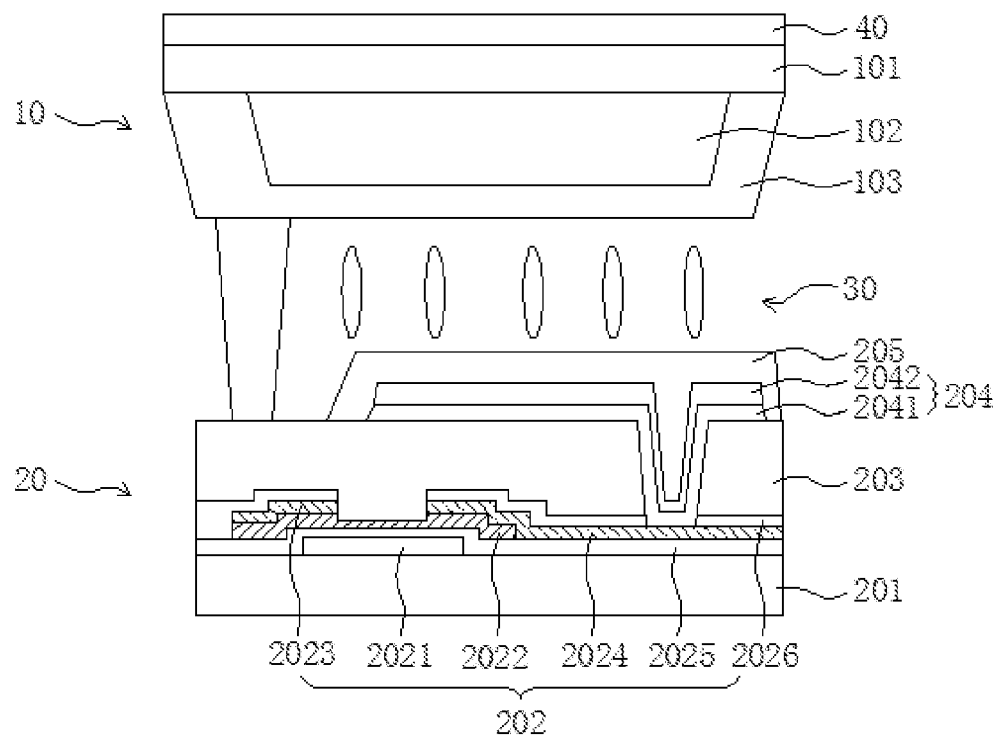
FIG. 1 is a schematic structural diagram of a liquid crystal display panel according to embodiment 1 of the present disclosure.

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

In the description of the present disclosure, it should be understood that terms such as "longitudinal", "lateral", "length", "width", "thickness", "upper", "lower", "front", "rear", "left", "right", "vertical", "horizontal", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or implicitly indicating the number of technical features indicated. Thus, features limited by "first" and "second" are intended to indicate or imply including one or more than one these features. In the description of the present disclosure, "a plurality of" relates to two or more than two, unless otherwise specified.

At present, since total reflective liquid crystal display panels do not require backlight modules but realize picture display by external light entering the panels and then emitting from pixel areas via reflection, they have advantages of low power consumption, lightweightness, thinness, and low cost. Conventional total reflective liquid crystal display panels generally have a metal reflective layer between a first substrate electrode and a second substrate electrode. Reflective effect of the metal reflective layer on ambient light is used to realize display function of the total reflective liquid crystal display panels. However, the conventional total reflective liquid crystal display panels have lower utilization of the ambient light and cannot display normally under darker ambient light, thereby limiting development of the total reflective liquid crystal display panels.

Based on this, a primary objective of the present disclosure is to provide a liquid crystal display panel, which solves the problems of lower utilization of the ambient light and inability to display normally under the darker ambient light in the conventional total reflective liquid crystal display panels.

In addition, in the conventional reflective liquid crystal display panels, the metal reflective layer is easy to be corroded and oxidized by external environment, so a transparent protective layer (such as ITO and ZnO) is usually covered on the metal reflective layer to protect the metal reflective layer from being corroded and oxidized by the external environment. However, the transparent protective layer will reduce reflectivity of the metal reflective layer to a certain degree, thereby affecting display effect of the total reflective liquid crystal display panels.

Based on this, another objective of the present disclosure is to provide a liquid crystal display panel, which solves a problem of a dilemma between protection of the metal reflective layer and improvement of reflectivity of the metal reflective layer in the conventional total reflective liquid crystal display panels.

In addition, due to advantages such as low cost, liquid crystal display panels are widely used in various electronic equipment/display devices in various fields. With rise of e-books, conventional e-books adopting electronic ink technology have been unable to meet people's requirements due to their only black-white-gray display, so it is necessary to find a better solution for e-books to realize full-color display.

Based on this, yet another objective of the present disclosure is to provide a liquid crystal display panel, which can be applied to e-books, particularly, a liquid crystal display panel capable of realizing full-color display of e-books.

The liquid crystal display panel of the present disclosure will be described in detail below in conjunction with specific embodiments.

Referring to FIGS. 1 to 4, the liquid crystal display panel of the present disclosure includes a color filter substrate 10, an array substrate 20 disposed opposite to the color filter substrate 10, and a liquid crystal layer 30 disposed between the color filter substrate 10 and the array substrate 20. The color filter substrate 10 includes a first substrate 101, color resists 102 on the first substrate 101, and a common electrode 103 on the color resists 102.

The array substrate 20 includes a second substrate 201, an array driving layer 202 disposed on the second substrate 201, an insulating layer 203 disposed on the array driving layer 202, a pixel electrode 204 disposed on the insulating layer 203 and electrically connected to a thin film transistor in the array driving layer 202 by a via hole on the insulating layer 203, and a distributed Bragg reflective film 205 disposed on the pixel electrode 204. Wherein, the pixel electrode 204 is a reflective electrode, so the liquid crystal display panel of the present disclosure is a total reflective liquid crystal display panel.

Of course, the liquid crystal display panel of the present disclosure also includes other conventional film layers, such as a polarizer and a protective cover plate, which is not limited here.

The distributed Bragg reflective film 205 is a special total dielectric reflective film and is usually composed of compounds having different refractive indexes stacked alternatingly to have a periodic modulation of the refractive indexes in one dimension of space, thereby generating strong interference and realizing selective light reflection within a predetermined wavelength range.

The distributed Bragg reflective film 205 of the present disclosure includes M reflective film groups in a stack, and each of the reflective film groups includes N sub reflective layers. Wherein, M is a positive integer of greater than or equal to 1, and N is a positive integer of greater than or equal to 2.

The present disclosure adopts a combination of a reflective pixel electrode and the distributed Bragg reflective film, which can improve reflectivity of the total reflective liquid crystal display panel (the metal reflective layer) and utilization of ambient light for the total reflective liquid crystal display panel, thereby allowing the total reflective liquid crystal display panel to display normally under darker ambient light and meanwhile, realizing protection of the metal reflective layer. In addition, the liquid crystal display panel of the present disclosure can be applied to the e-book field, thereby realizing full-color display of e-books.

Embodiment 1

Referring to FIG. 1, FIG. 1 is a schematic structural diagram of a liquid crystal display panel according to embodiment 1 of the present disclosure. This embodiment takes the thin film transistor being a bottom-gate structure as an example for description. It can be understood that the thin film transistor may be a top-gate structure in other embodiments. The array driving layer 202 in the array substrate 20 includes, but is not limited to, the thin film transistor and inorganic film layers. The thin film transistor includes a gate electrode 2021 disposed on the second substrate 201, an active layer 2022 corresponding to the gate electrode 2021 and disposed on a gate insulating layer 2025, and a source electrode 2023 and a drain electrode 2024 electrically connected to the active layer 2022. The inorganic film layers include the gate insulating layer 2025 and a passivation layer 2026. One side of the color filter substrate 10 facing away from the array substrate 20 is provided with a polarizer 40.

Wherein, the pixel electrode 204 includes the metal reflective layer 2041 and an electrode layer 2042 disposed on the metal reflective layer 2041. A material of the metal reflective layer 2041 includes, but is not limited to, one of metal materials such as copper, aluminum, or silver, or one or more of alloys. A material of the electrode layer 2042 includes, but is not limited to, ITO or ZnO. Disposition of the electrode layer 2042 can protect the metal reflective layer 2041 from being corroded and oxidized by external environment.

Wherein, an orthographic projection of the distributed Bragg reflective film 205 on the second substrate 201 at least covers an orthographic projection of the pixel electrode 204 on the second substrate 201, thereby ensuring the distributed Bragg reflective film 205 to completely cover the metal reflective layer 2041.

In other embodiments, the distributed Bragg reflective film 205 can be disposed on the array substrate with a whole surface, thereby omitting one mask process.

Figure 2:
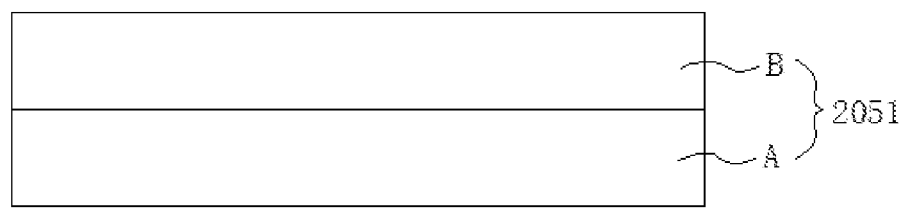
FIG. 2 is a schematic structural diagram of a distributed Bragg reflective film according to embodiment 1 of the present disclosure.

Combined with FIG. 2, FIG. 2 is a schematic structural diagram of the distributed Bragg reflective film according to embodiment 1 of the present disclosure. The distributed Bragg reflective film 205 in this embodiment includes one reflective film group 2051, and the reflective film group 2051 includes a first sub reflective layer A and a second sub reflective layer B. Refractive indexes of the first sub reflective layer A and the second sub reflective layer B are different. Wherein, the refractive index of the first sub reflective layer A is greater than the refractive index of the second sub reflective layer B, and the second sub reflective layer B is disposed on one side of the first sub reflective layer A away from the metal reflective layer 2041.

Wherein, materials of the sub reflective layers include silicon nitride and silicon oxide, but are not limited to these, as long as different sub reflective layers have different refractive indexes. In this embodiment, the material of the first sub reflective layer A is silicon nitride, and the material of the second sub reflective layer B is silicon oxide.

A thickness of the reflective film group 2051 affects the light reflectivity of the metal reflective layer 2041. Specifically, since the reflective film group 2051 has half-wave loss (phase difference $\pi$), for example, when light is incident, a condition of constructive interference for reflected light is $2nd+\lambda/2=k\lambda$ ($k=1, 2, 3, \ldots$), and an optical thickness of the reflective film group 2051 at this time $nd=((2k-1)\lambda)/4$ can be obtained. That is, the reflected light will have a peak value when the optical thickness of the reflective film group 2051 is an odd multiple of a quarter of wavelengths, and at this time, the reflectivity of the metal reflective layer 2041 to external light will be enhanced. The peak value of the reflectivity is sensitive to a film thickness, and particularly, when the film thickness is a quarter of the wavelengths, the reflectivity of the metal reflective layer 2041 to the external light will be the highest.

Preferably, the film thickness of the reflective film group 2051 is a quarter of the wavelengths. When the external light enters the liquid crystal display panel and is reflected out of the liquid crystal display panel by the metal reflective layer 2041, the light will have thin-film interference. That is, metal light reflected will undergo constructive interference when passing through the distributed Bragg reflective film 205, thereby enhancing the reflected light, and overall increasing the reflectivity of the metal reflective layer 2041. Therefore, this embodiment can improve the utilization of ambient light for the total reflective liquid crystal display panel, thereby allowing the total reflective liquid crystal display panel to display normally under darker ambient light.

Embodiment 2

Figure 3:
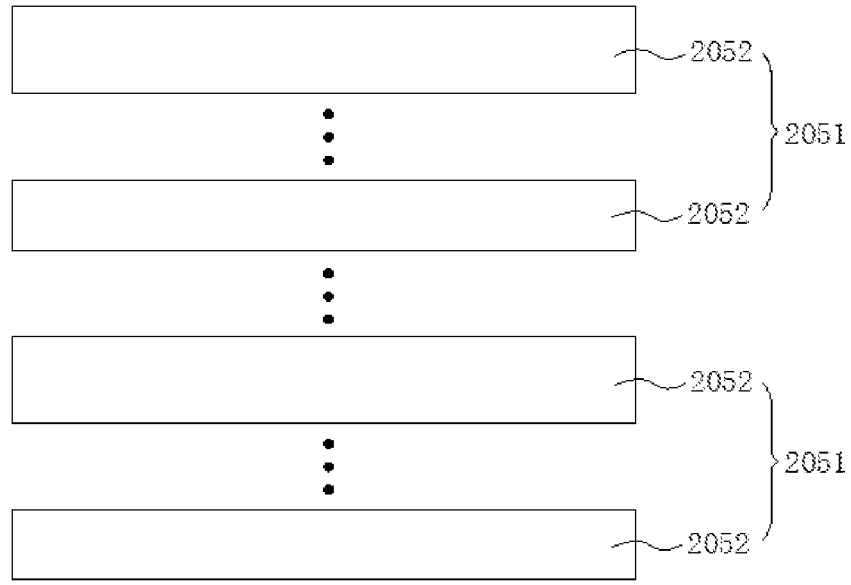
FIG. 3 is a schematic structural diagram of the distributed Bragg reflective film in the liquid crystal display panel according to embodiment 2 of the present disclosure.

Referring to FIG. 3, FIG. 3 is a schematic structural diagram of the distributed Bragg reflective film in the liquid crystal display panel according to embodiment 2 of the present disclosure. The liquid crystal display panel in this embodiment and the liquid crystal display panel in embodiment 1 have a same/similar structure. The difference is that the distributed Bragg reflective film 205 in this embodiment includes M reflective film groups 2051 repeatedly stacked, and each of the reflective film groups 2051 includes N sub reflective layers 2052, wherein, M is a positive integer of greater than 1 (such as 2, 3, or 4), and N is a positive integer of greater than or equal to 2 (such as 2, 3, or 4). Wherein, refractive indexes of different sub reflective layers in a same reflective film group 2051 are different. Specifically, the refractive indexes of the sub reflective layers in the same reflective film group 2051 are reduced layer by layer from one side adjacent to the pixel electrode to one side away from the pixel electrode. Thicknesses of the reflective film groups 2051 are odd multiples of a quarter of wavelengths. In addition, the thicknesses of different reflective film groups 2051 in the distributed Bragg reflective film 205 are different.

Please refer to the following formula:

$$R = 1 - 4 \frac{N_L^{2M}}{n_H} \frac{n_S}{n_H^2}.$$

Wherein, R represents reflectivity, M represents a number of the reflective film groups, $n_H$ represents a highest refractive index of the sub reflective layers in one reflective film group, $n_L$ represents a lowest refractive index of the sub reflective layers in the reflective film group, and $n_S$ represents a refractive index of the metal reflective layer.

From the above formula, it can be known that the more reflective film groups 2051, the higher the reflectivity of the metal reflected light is. Therefore, this embodiment can further increase the refractive index of the metal reflective layer than the liquid crystal display panel in the above embodiment 1.

In addition, since the thicknesses of the different reflective film groups 2051 in the distributed Bragg reflective film 205 of this embodiment are different, selectivity of one quarter wavelength having highest reflection for single film thickness will be weakened. That is, multiple layers of the reflective film groups 2051 are beneficial for reducing selectivity of wavelengths in the reflected light, which allows light with different wavelengths to have similar reflectivity, thereby preventing color shift. Wherein, the more reflective film groups 2051 in the distributed Bragg reflective film 205 there are, the more effective it is in reducing the color shift.

Embodiment 3

Figure 4:
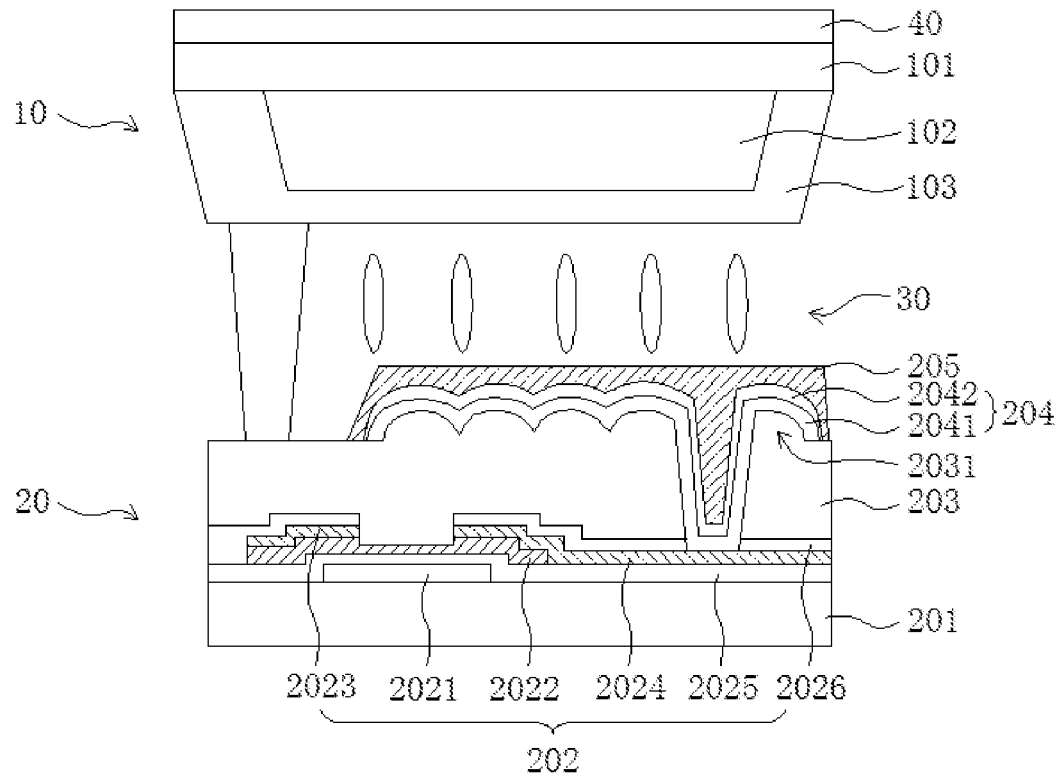
FIG. 4 is a schematic structural diagram of the liquid crystal display panel according to embodiment 3 of the present disclosure.

Referring to FIG. 4, FIG. 4 is a schematic structural diagram of the liquid crystal display panel according to embodiment 3 of the present disclosure. The liquid crystal display panel in this embodiment and the liquid crystal display panel in embodiment 1 have the same/similar structure. The difference is that one side surface of the insulating layer 203 of this embodiment facing the pixel electrode 204 is provided with a plurality of protruding structures 2031 corresponding to the pixel electrode 204, and the metal reflective layer 2041 is disposed undulatedly along a surface of the protruding structures 2031.

Wherein, the insulating layer 203 may be an organic material, but it is not limited thereto. A shape of the protruding structures 2031 may be hemispherical, conical, or platform-like, which is not limited herein.

Due to disposition of the protruding structures 2031, this embodiment makes a surface of the metal reflective layer 2041 form a diffuse reflection structure, thereby further improving display effect of the liquid crystal display panel.

In summary, by disposing the distributed Bragg reflective film on the metal reflective layer of the total reflective liquid crystal display panel, the liquid crystal display panel provided in the present disclosure can improve light reflectivity of the total reflective liquid crystal display panel, thereby solving problems of lower utilization of ambient light and inability to display normally under darker ambient light in conventional total reflective liquid crystal display panels. In addition, selectivity of wavelengths in the reflected light can also be reduced, which allows light with different wavelengths to have similar reflectivity, thereby preventing color shift. Furthermore, the liquid crystal display panel of the present disclosure does not require a backlight but directly uses external light as a light source by controlling deflection of liquid crystals to perform full-color display.

The present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A liquid crystal display panel, comprising a color filter substrate, an array substrate disposed opposite to the color filter substrate, and a liquid crystal layer disposed between the color filter substrate and the array substrate, wherein the array substrate comprises:
    a substrate;
    an array driving layer disposed on the substrate;
    an insulating layer disposed on the array driving layer;
    a pixel electrode disposed on the insulating layer and electrically connected to a thin film transistor in the array driving layer by a via hole on the insulating layer; and
    a distributed Bragg reflective film disposed on the pixel electrode;
    wherein the distributed Bragg reflective film comprises M reflective film groups in a stack, and each of the reflective film groups comprises N sub reflective layers, where M is a positive integer of greater than or equal to 1, and N is a positive integer of greater than or equal to 2;
    wherein refractive indexes of different sub reflective layers in a same reflective film group are different; and wherein the refractive indexes of the sub reflective layers in the same reflective film group are reduced layer by layer from one side adjacent to the pixel electrode to one side away from the pixel electrode.

2. The liquid crystal display panel according to claim 1, wherein thicknesses of the reflective film groups are odd multiples of a quarter of wavelengths.

3. The liquid crystal display panel according to claim 1, wherein thicknesses of different reflective film groups in the distributed Bragg reflective film are different.

4. The liquid crystal display panel according to claim 1, wherein materials of the sub reflective layers comprise silicon nitride and silicon oxide.

5. The liquid crystal display panel according to claim 1, wherein the pixel electrode is a reflective electrode and comprises a metal reflective layer and an electrode layer disposed on the metal reflective layer.

6. The liquid crystal display panel according to claim 5, wherein an orthographic projection of the distributed Bragg reflective film on the substrate at least covers an orthographic projection of the pixel electrode on the substrate.

7. The liquid crystal display panel according to claim 5, wherein one side surface of the insulating layer facing the pixel electrode is provided with a plurality of protruding structures corresponding to the pixel electrode, and the metal reflective layer is disposed undulatedly along a surface of the protruding structures.

8. A liquid crystal display panel, comprising a color filter substrate, an array substrate disposed opposite to the color filter substrate, and a liquid crystal layer disposed between the color filter substrate and the array substrate, wherein the color filter substrate comprises color resists and a common electrode, and the array substrate comprises:

a substrate;

an array driving layer disposed on the substrate;

an insulating layer disposed on the array driving layer;

a pixel electrode disposed on the insulating layer and electrically connected to a thin film transistor in the array driving layer by a via hole on the insulating layer; and a distributed Bragg reflective film disposed on the pixel electrode;

wherein the distributed Bragg reflective film comprises M reflective film groups in a stack, and each of the reflective film groups comprises N sub reflective layers, wherein M is a positive integer of greater than or equal to 1, and N is a positive integer of greater than or equal to 2;

wherein refractive indexes of different sub reflective layers in a same reflective film group are different; and wherein the refractive indexes of the sub reflective layers in the same reflective film group are reduced layer by layer from one side adjacent to the pixel electrode to one side away from the pixel electrode.

9. The liquid crystal display panel according to claim 8, wherein thicknesses of the reflective film groups are odd multiples of a quarter of wavelengths.

10. The liquid crystal display panel according to claim 8, wherein thicknesses of different reflective film groups in the distributed Bragg reflective film are different.

11. The liquid crystal display panel according to claim 8, wherein materials of the sub reflective layers comprise silicon nitride and silicon oxide.

12. The liquid crystal display panel according to claim 8, wherein the pixel electrode is a reflective electrode and comprises a metal reflective layer and an electrode layer disposed on the metal reflective layer.

13. The liquid crystal display panel according to claim 12, wherein an orthographic projection of the distributed Bragg reflective film on the substrate at least covers an orthographic projection of the pixel electrode on the substrate.

14. The liquid crystal display panel according to claim 12, wherein one side surface of the insulating layer facing the pixel electrode is provided with a plurality of protruding structures corresponding to the pixel electrode, and the metal reflective layer is disposed undulatedly along a surface of the protruding structures.

* * * * *